Patented Dec. 10, 1935

2,023,688

UNITED STATES PATENT OFFICE 2,023,688

ROAD COVERING SURFACE AND THE LIKE

Bernard William Deacon Lacey, Ward End, Birmingham, and Percy John Bawcutt, Yardley, Birmingham, England, assignors to Dunlop Rubber Company Limited, London, England, a British corporation No Drawing. Application June 28, 1932, Serial No. 619,736. In Great Britain July 11, 1931

8 Claims. (Cl. 94—7)

This invention relates to compositions for covering the surfaces of roads and the like and for the manufacture of paving blocks.

The object of the invention is to produce road and the like surfaces and the road surface of paving blocks from rubber compositions.

Compositions of rubber in the form of aqueous dispersions thereof suitable for the application as a surfacing material for roads should have the following characteristics.

The solid content of the aqueous dispersions should be high so as to minimize shrinkage on drying. The highly concentrated aqueous dispersions are to be stable and are to be such that upon solidification, as by drying, produce cohesive products. The solid material produced has also to resist disintegrating and weather conditions and should also be easily repaired. The compositions should also be cheap and easily handled.

It has been found that aqueous dispersions derived from natural dispersions of rubber or similar vegetable resins, whether employed alone or with rubber crumb, cements and other fillers, do not yield compositions suitable for covering the surfaces of roads and the like, and for the manufacture of paving blocks.

Such compositions are particularly deficient in yielding solid products having the necessary cohesiveness. We have now found, however, that suitable compositions can be prepared from rubber crumb in admixture with artificial aqueous dispersions of coagulated rubber such as reclaim or masticated rubber. It is well known, for example, that masticated rubber possesses a greater stickiness or tackiness than rubber obtained directly from rubber latex.

According to the present invention, the method for producing road and the like surfaces and the like and paving blocks comprises producing the surface of the road and road surface of the paving block from rubber compositions (preferably completely free from cement) prepared from rubber crumb in admixture with a relatively highly concentrated artificial aqueous dispersion of coagulated rubber or the like materials.

It is desirable that the aforesaid compositions should be admixed with relatively large proportions of protective colloids such as ammonium oleate, as such reagents increase the stability of the compositions and probably the cohesiveness of the resulting products.

The artificial aqueous dispersions should preferably have a concentration above 65% total solids. Compositions having the total solid content of 76% have given particularly favorable results.

Examples of artificial aqueous dispersions which can be used in admixture with rubber crumb are dispersions of coagulated, vulcanized or unvulcanized rubber or similar natural or artificial products, rubber waste, reclaimed rubber, rubber substitutes, like factice, coagulated balata or gutta percha, or mixtures of two or more of the same.

If desired the compositions of rubber crumb and artificial aqueous dispersions can be admixed with small quantities, for example, not over thirty parts, of natural aqueous dispersions of rubber or the like.

The aforesaid compositions of rubber crumb and artificial aqueous dispersions can be compounded with suitable hardening or filling ingredients such as whiting and carbon black.

Methods known per se for the production of artificial aqueous dispersions of rubber or the like can be employed in the production of compositions according to the present invention, as for the methods described and claimed in British Patents 296,685, 313,028, and 313,027.

Compositions according to the invention can be applied to a suitable under-surface in dispersed flocculated or semi-coagulated condition, or as a paste, and thereafter coagulated or consolidated by drying or hot or cold rolling.

Where one or more layers of the aforesaid compositions are applied, these may vary somewhat in their make-up as, for instance, the under layer or layers may be of such composition as to yield harder products.

On the other hand, the intermediate layer or layers applied may consist of other materials than the aforesaid compositions. The following are examples of compositions according to the invention.

A rubber reclaim dispersion of the following composition—

| | Parts by weight |
|---|---|
| Rubber reclaim | 96.0 |
| Sulphur | 3.0 |
| Zinc diethyl-dithiocarbamate | 1.0 |
| | 100.0 | is first prepared in known manner. This reclaimed dispersion is made so as to have a concentration of 65% total solids.

For making a composition suitable as a top layer for covering the surfaces of roads and the like and for the manufacture of paving blocks, this reclaimed dispersion is admixed with ammonium oleate, whiting, black and rubber latex so as to have the following composition:

| | Parts by weight |
|---|---|
| Rubber reclaim dispersion (65% conc:) | 26.7 |
| Ammonium oleate (50% conc:) | 13.3 |
| Rubber crumb | 26.7 |
| Whiting | 13.3 |
| Black | 6.7 |
| Rubber latex (60% conc:) | 13.3 |
| | 100.0 |

In the production of rubber surfaced paving blocks, e. g., concrete blocks of desired shape are placed in molds and the composition of crumb rubber and artificial aqueous dispersions of rubber applied to the top surface of the blocks. A suitable intermediate layer between the top layer made from the above composition and the road foundation is, for example, an admixture of 65% rubber reclaim dispersion with rubber latex, soft soap and cement in the following proportions:

| | Parts by weight |
|---|---|
| Rubber reclaim dispersion (65% conc:) | 28.5 |
| Rubber latex (60% conc:) | 14.3 |
| Soft soap | 7.2 |
| Cement | 50.0 |
| | 100.0 |

For the intermediate layer where extra hardness is required, a high proportion of cement is necessary and, in order to preserve the stability of this mixture, soft soap is preferable to ammonium oleate.

What we claim is:

1. A method for producing road and the like surfaces and paving blocks which comprises applying to a base a surface layer of rubber crumb in admixture with a relatively highly concentrated artificial aqueous dispersion of coagulated rubber or the like materials.

2. A method as claimed in claim 1 wherein the compositions employed contain relatively large proportions of protective colloids.

3. A method as claimed in claim 1 wherein relatively large proportions of ammonium oleate are employed.

4. A method as claimed in claim 1 wherein the artificial aqueous dispersions of rubber used in admixture with rubber crumb have a concentration of above 65% total solids.

5. A method as claimed in claim 1 wherein the artificial aqueous dispersions of rubber used have a total solid content of 76%.

6. A method as claimed in claim 1 wherein the admixture of rubber crumb and artificial aqueous dispersions of rubber are compounded with suitable hardening or filling ingredients.

7. A method for producing road and the like surfaces and paving blocks which comprises applying to a base successive layers of rubber crumb in admixture with a relatively highly concentrated artificial aqueous dispersion of coagulated rubber, said successive layers differing in proportion of crumb and dispersion and containing differing portions of compounding ingredients to give different degrees of hardness and resiliency.

8. A method for producing road and the like surfaces and paving blocks which comprises applying to a base a layer of relatively highly concentrated artificial aqueous dispersion of coagulated rubber containing cement and superposing on this layer a layer of rubber crumb in admixture with a highly concentrated aqueous dispersion comprising coagulated rubber artificially dispersed.

BERNARD WILLIAM DEACON LACEY.
PERCY JOHN BAWCUTT.